(12) United States Patent
Morgan (10) Patent No.: US 9,559,871 B2
(45) Date of Patent: Jan. 31, 2017

(54) COMPOSITE CHANNEL EQUALIZATION OF A WIDEBAND WIRELESS COMMUNICATION SYSTEM

(75) Inventor: Dennis Raymond Morgan, Morristown, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1084 days.

(21) Appl. No.: 11/329,375

(22) Filed: Jan. 10, 2006

(65) Prior Publication Data

US 2007/0160165 A1 Jul. 12, 2007

(51) Int. Cl.
*H04L 27/00* (2006.01)
*H04L 25/02* (2006.01)
*H04B 7/08* (2006.01)
*H04L 25/03* (2006.01)

(52) U.S. Cl.
CPC ......... *H04L 25/0204* (2013.01); *H04B 7/0857* (2013.01); *H04L 25/03343* (2013.01); *H04L 2025/03414* (2013.01); *H04L 2025/03426* (2013.01)

(58) Field of Classification Search
CPC .................. H04L 25/022; H04L 2025/03426; H04L 2025/03414; H04L 25/0208; H04B 7/0615; H04B 3/14; H04B 7/0857; H04B 7/0842

See application file for complete search history.

(56) References Cited

U.S. PATENT DOCUMENTS

| | | | |
|---|---|---|---|
| 6,298,082 B1 * | 10/2001 | Harrison | H04B 1/712 375/144 |
| 6,687,492 B1 * | 2/2004 | Sugar et al. | 455/276.1 |
| 6,718,184 B1 | 4/2004 | Aiken et al. | 455/562.1 |
| 7,099,698 B2 * | 8/2006 | Tarokh et al. | 455/562.1 |
| 7,472,041 B2 * | 12/2008 | Taenzer et al. | 702/189 |

(Continued)

OTHER PUBLICATIONS

J. Zhang, W. Ser and J. Zhu, "Effective optimization method for channel shortening in OFDM systems", Nanyang Technological University, Singapore and ESS Technology, Apr. 2003, IEE.*

(Continued)

*Primary Examiner* — Aristocratis Fotakis
(74) *Attorney, Agent, or Firm* — Davidson Sheehan LLP (57) ABSTRACT

A method and an apparatus for using a plurality of antennas to equalize a composite propagation channel of a wideband wireless communication is provided. The method comprises adjusting a corresponding weight associated with at least two of the plurality of antennas to obtain a channel response from the plurality of antennas over a composite propagation channel. The method further comprises equalizing the channel response of the composite propagation channel over a given bandwidth based on the corresponding weights for the wireless communication over a wideband frequency range. By adjusting a complex weight associated with each of the set of transmit antennas, a wireless communication system may obtain a channel response from the plurality of antennas over the composite propagation channel. In this way, the wireless communication system may combine multiple antenna signals from the set of transmit antennas with the complex weights to provide an overall transfer function that is substantially flat over a given bandwidth.

25 Claims, 9 Drawing Sheets

(56) References Cited

U.S. PATENT DOCUMENTS

| | | | |
|---|---|---|---|
| 2002/0118781 A1* | 8/2002 | Thomas et al. | 375/347 |
| 2002/0127978 A1* | 9/2002 | Khatri | 455/103 |
| 2003/0103578 A1* | 6/2003 | Yeh et al. | 375/296 |
| 2003/0103579 A1* | 6/2003 | Webster | H04L 25/03159 375/298 |
| 2003/0148770 A1* | 8/2003 | Das et al. | 455/455 |
| 2003/0165187 A1* | 9/2003 | Tesfai et al. | 375/219 |
| 2004/0072546 A1* | 4/2004 | Sugar et al. | 455/127.1 |
| 2004/0147227 A1* | 7/2004 | Hamalainen et al. | 455/69 |
| 2006/0067277 A1* | 3/2006 | Thomas et al. | 370/334 |
| 2006/0072524 A1* | 4/2006 | Perahia | H04L 25/022 370/338 |

OTHER PUBLICATIONS

Andreas F.Molisch, Moe Z.Win and Jack H.Winters, "Space-Time-Frequency (STF) Coding for MIMO-OFDM Systems", AT&T Labs, Sep. 2002, IEEE.*

Daniel Pérez Palomar and Miguel Angel Lagunas, "Joint Transmit—Receive Space—Time Equalization in Spatially Correlated MIMO Channels:A Beamforming Approach", Technical University of Catalonia, Jun. 2003, IEEE.*

Ying-Chang Liang and John M.Cioffi, "Combining Transmit Beamforming, Space-Time Block Coding and Delay Spread Reduction", Stanford University, 2003 IEEE.*

Gregory Carey, Introduction to Matrix Algebra, Psychology 7291: Multivariate Statistics (Carey), handouts, University of Colorado, Aug. 1998.*

"Adaptive Channel Equalizer for WCDMA Downlink" by Kari Hooli, et al, University of Oulu, Centre for Wireless Communications, Jun. 2001.

"MIMO Systems with Antenna Selection—An Overview" by Andreas F. Molisch and Moe Z. Win, TR-2004-014; Mar. 2004.

"Layering Techniques for Space-Time Communication in Multi-User Network" by Behrouz Farhang-Boroujeny, et al, Oct. 2003.

"From Theory to Practice: An Overview of MIMO Space-Time Coded Wireless Systems" by David Gesbert, et al, IEEE Journal on Selected Areas in Communications, vol. 21, No. 3, Apr. 2003.

"Breaking the Barriers of Shannon's Capacity: An Overview of MIMI Wireless Systems" by David Besbert, et al, Telenor's Journal: Telektronikk, Feb. 2002.

* cited by examiner

COMPOSITE CHANNEL EQUALIZATION OF A WIDEBAND WIRELESS COMMUNICATION SYSTEM

BACKGROUND OF THE INVENTION

1. Field of the Invention

This invention relates generally to telecommunications, and more particularly, to wireless communications.

2. Description of the Related Art

With a rapid increase in bandwidth consumption by service subscribers on a wireless network, use of multiple transmit and/or receive antennas has grown considerably across a variety of communication devices and systems. In particular, systems that use multiple transmit and receive antennas are sometimes referred to as multiple-input multiple-output (MIMO) systems. Among other things, for example, a typical MIMO system may deploy multiple transmit and/or receive antennas to increase the achievable bit rate for transmission of large data. However, such use of multiple transmit and/or receive antennas in a MIMO system either involves equalization over large bandwidths or operating over sub-bands, such as in orthogonal frequency-domain multiplexing (OFDM) bands.

A conventional MIMO system that uses multiple antennas processes the channel responses in parallel. When using multiple antennas, a conventional beamformer may steer a beam in different directions before selecting the one that results in the "best" channel response. However, for radio frequency (RF) propagation in a MIMO system, a single channel based on a particular antenna orientation or element phasing may provide an exceptional channel response relative to other available channels. Since a conventional beamformer can only tune to a linear wave-front and does not have the flexibility of arbitrary complex weighting of multiple antennas, significant performance degradation may result.

Moreover, in a diverse scattering environment, a transmitter associated with a MIMO system based on the beam steering may cause a receiver to sense signal energy from many paths over different angles-of-arrival. Even though the beam steering may emphasize some paths over others in such a way as to result in a good channel response, in general, many applications of the beam steering are somewhat limiting since individual performance of antennas of the multiple antennas is based on beam directions. Another approach that uses multiple antennas involves diversity combining to maximize signal power even if the channel response over a desired bandwidth may be unacceptable.

A digital wireless communication system may use either a wideband transmission scheme, such as Code Division Multiple Access (CDMA) or a narrowband transmission scheme, such as orthogonal frequency-division multiplexing (OFDM). A CDMA based wideband transmission may use the channel symbols or chips of a far shorter duration than the maximum delay of the mobile channel. An OFDM based narrowband transmission may use channels (sub-carriers) where many narrowband channels may be transmitted in parallel. The duration of the transmitted symbols over a signal channel may distinguish a wideband wireless digital communication from a narrowband wireless digital communication. For the signal channel, the duration from a first received path to the last received path that has significant power determines the maximum delay of the channel.

However, a radio frequency signal for a wireless digital communication may use multiple paths between a transmitter and a receiver. Such multi-paths may cause signal fading, which may degrade performance of a digital communications system, resulting in lost data or dropped calls in a cellular system. Fading may occur in various forms, including a flat fading. In the flat fading, the same degree of fading takes place for all of the frequency components transmitted through a signal channel and within the channel bandwidth. That is, all the frequency components of the transmitted signal rise and fall together. In contrast, a frequency-selective fading may cause different frequencies of an input signal to be attenuated and phase shifted differently in a channel. An equalizer may provide a desired performance for the channels that may experience frequency-selective fading by restoring the flat fading of the channels. In the time domain, the frequency-selective fading is sometimes called a multi-path delay spread.

One effect of the multi-path fading in the frequency domain is that wideband signals suffer from frequency-selective fading, which means that different parts of the spectrum are faded more than others. Instead, narrowband signals suffer from flat fading where the whole signal spectrum fades. However, if an antenna receives a signal with zero amplitude, the signal is sometimes referred to be in deep fade. Deep fades occur more frequently the faster a mobile station travels, but the duration that the signal is in deep fades decreases as the speed of the mobile increases.

Additionally, a conventional equalizer may use time delay taps. A time delay tap provides a setting with adjustable time delay intervals to trip after a set delay regardless of an input signal state. By varying the delay time tap setting, an equalizer may define handling of transients. However, this use of time delay taps for equalization of a signal propagation channel cannot accommodate deep fades without sacrificing noise immunity.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

The present invention is directed to overcoming, or at least reducing, the effects of, one or more of the problems set forth above.

In one embodiment of the present invention, a method for using a plurality of antennas to equalize a composite propagation channel of a wideband wireless communication system is provided. The method comprises adjusting a corresponding weight associated with at least two of the plurality of antennas to obtain a channel response from the plurality of antennas over a composite propagation channel. The method further comprises equalizing the channel response of the composite propagation channel over a given bandwidth based on the corresponding weights for the wireless communication over a wideband frequency range.

BRIEF DESCRIPTION OF THE DRAWINGS

The invention may be understood by reference to the following description taken in conjunction with the accompanying drawings, in which like reference numerals identify like elements, and in which:

FIG. 5 schematically shows the overall frequency response of a conventional beamformer, which can be compared to the responses shown in FIG. 2a; and FIG. 6 schematically shows a performance metric, such as a cumulative distribution function of mean-square error associated with the composite propagation channel of a conventional beamformer, which can be compared to FIG. 4a.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions may be made to achieve the developers' specific goals, such as compliance with system-related and business-related constraints, which will vary from one implementation to another. Moreover, it should be appreciated that such a development effort might be complex and time-consuming, but may nevertheless be a routine undertaking for those of ordinary skill in the art having the benefit of this disclosure.

Generally, a method and an apparatus are provided for using a plurality of antennas to equalize a composite propagation channel of a wideband wireless communication system. The method comprises adjusting the corresponding weights associated with at least two of the plurality of antennas to obtain a channel response from the plurality of antennas over a composite propagation channel. The method further comprises equalizing the channel response of the composite propagation channel over a given bandwidth based on the corresponding weights for the wireless communication over a wideband frequency range. By adjusting a complex weight associated with each of the set of transmit antennas, a wireless communication system may obtain a channel response from the plurality of antennas over the composite propagation channel. In this way, the wireless communication system may combine multiple antenna signals from the set of transmit antennas with the complex weights to provide an overall transfer function that is substantially flat over a given bandwidth. To obtain optimal antenna weights, a channel frequency response metric may enable an equalizer to calculate the optimal antenna weights. In other words, channel estimates over a wideband frequency range may be used to provide the optimal antenna weights. For example, a linear-phase maximally-flat overall channel response may be obtained by optimally adjusting complex antenna weights, instead of maximizing signal power for diversity combining. The equalizer may equalize the channel response over a desired bandwidth for the composite propagation channel to accommodate deep fades without sacrificing noise immunity. For illustration purposes, however, only an exemplary antenna configuration that uses multiple transmit antennas and a single receive antenna, i.e., a multiple-input single output (MISO) is further described for a wireless communication system. Alternatively, a wireless communication system may use multiple receive antennas and a single transmit antenna, i.e., a single-input multiple output (SIMO) antenna configuration. Another embodiment may deploy multiple transmit and receive antennas.

Figure 1:
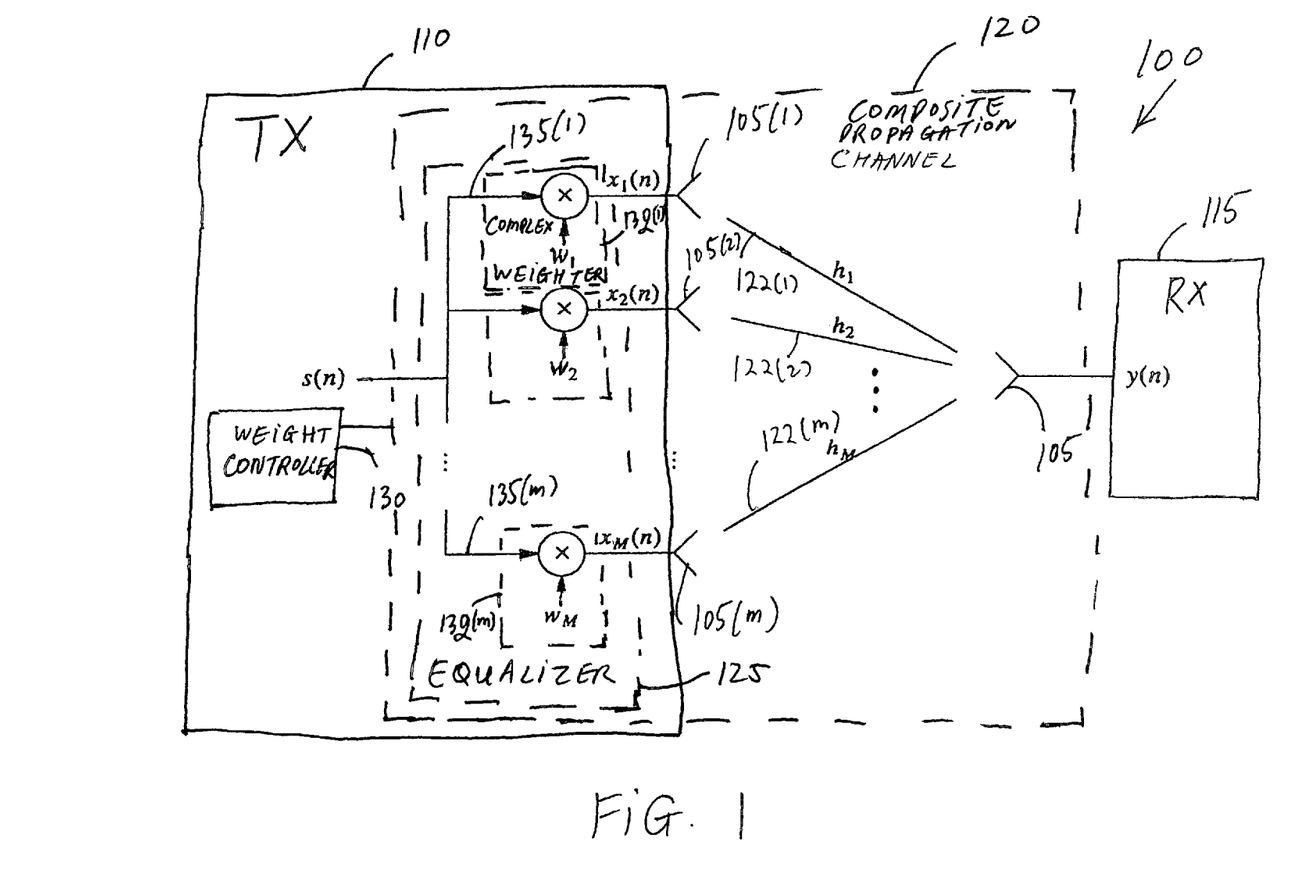
FIG. 1 schematically depicts a wireless communication system that includes a plurality of antennas for equalizing a composite propagation channel over a wideband frequency range based on complex antenna weights in accordance with one embodiment of the present invention.

Referring to FIG. 1, a wireless communication system 100 may use a plurality of antennas including a set of transmit antennas 105(1-$m$) and a receive antenna 105 for equalizing a channel of antenna signals for a wireless communication over a wideband frequency range according to one illustrative embodiment of the present invention. The term wideband frequency range is a relative term that generally indicates a desired range of frequencies in a spectrum for transmission of the wireless communication using capacity or bandwidth of a signal propagation channel. One example of the wideband frequency range may be 150 Mega Hertz (MHz) for transmitting over a bandwidth between 64 Kilo bits per second (Kbits/s) and 2 Mbit/s. By adjusting a complex weight associated with at least two of the set of transmit antennas 105(1-$m$), the wireless communication system 100 may obtain a channel response from the plurality of antennas over a wideband wireless communication channel, such as a composite propagation channel 120.

In one embodiment, the composite propagation channel 120 may combine multiple antenna signals from the set of transmit antennas 105(1-$m$) with the complex weights to provide an overall transfer function that is substantially flat over a given bandwidth (e.g., 2-2.1 Giga Hertz (GHz). Essentially, use of the plurality of transmit antennas 105(1-$m$) and the receive antenna 105 to equalize the composite propagation channel 120 over the wideband frequency range may avoid conventional time delay taps and provide immunity from noise associated with fading of a channel response.

Consistent with one embodiment, the wireless communication system 100 may comprise a transmitter (TX) 110 coupled to the set of transmit antennas 105(1-$m$) and a receiver (RX) 115 coupled to the received antenna 105. The transmitter 110 may transmit the wireless communication over the composite propagation channel 120 using at least two transmit antennas of the set of transmit antennas 105 (1-$m$).

By transmitting a wireless communication, for example, over at least two of a plurality of signal propagation paths 122(1-$m$), in one embodiment, the wireless communication system 100 may enable equalization of the composite propagation channel 120. For example, a first signal propagation path 122(1) may be associated with a first transmit antenna 105(1) and a second signal propagation path 122(2) may be associated with a second transmit antenna 105(2) of the set of transmit antennas 105(1-*m*).

Although FIG. 1 shows a multiple-input single-output (MISO) antenna configuration in which the transmitter 110 comprises M-transmit antennas, i.e., 105(1-*m*), and the receiver 115 comprises the single receive antenna 105, persons of ordinary skill in the art would appreciate that any one of desired antenna configurations of single or multiple transmit and/or receive antennas may be used depending on a particular application. However, for brevity, an exemplary antenna configuration is shown in FIG. 1 to include the set of transmit antennas 105(1-*m*) and the single receive antenna 105. This antenna configuration may enable a multiple-input single-output communication link over the composite propagation channel 120.

Consistent with one embodiment of the present invention, the transmitter 110 may comprise an equalizer 125 that may equalize the channel response of the composite propagation channel 120 over a given bandwidth. To this end, the transmitter 110 may further comprise a weight controller 130 to determine complex weights associated with at least two of the set of transmit antennas 105(1-*m*) that substantially flatten the overall transfer function across a given bandwidth.

In this manner, over the composite propagation channel 120, a common transmit signal s(n) may propagate through the plurality of signal propagation paths 122(1-*m*) from the set of transmit antenna signals $x_m(n)$, m=1, 2, ..., M to the single receive antenna 105. To apply a corresponding complex weight associated with at least two of the set of transmit antennas 105(1-*m*) to the common transmit signal s(n), the equalizer 125 may include a plurality of complex weighters 132(1-*m*). In particular, each complex weighter 132 may separately adjust a transmit antenna signal $x_m(n)$, m=1, 2, ..., M. Using the single receive antenna 105, the receiver 115 may receive an antenna signal y(n) over the composite propagation channel 120 with a desired channel response.

The weight controller 130 may adjust the complex weights for at least two of the set of transmit antennas 105(1-*m*), for example, to obtain optimal complex scalar weights associated with at least two of the set of transmit antennas 105(1-*m*). By optimally adjusting the corresponding complex weights associated with at least two of the set of transmit antennas 105(1-*m*), the transmitter 110 may obtain a desired channel response from the set of transmit antennas 105(1-*m*) for a wireless communication over a wideband frequency range on the composite propagation channel 120.

In operation, the plurality of complex weighters 132(1-*m*) may apply complex scalar weight coefficients $w_m$, m=1, 2, ..., M to the common transmit signal s(n) that the transmitter 110 may transmit over at least two of the set of transmit antennas 105(1-*m*). The complex weighters 132 may combine an antenna signal 135 associated with at least two of the set of transmit antennas 105(1-*m*) with a corresponding complex scalar weight coefficient "w." In this way, the equalizer 125 may determine such an overall transfer function for the set of transmit antennas 105(1-*m*) that remains substantially flat over the given bandwidth. The overall transfer function may indicate the channel response for the composite propagation channel 120.

At the complex weighters 132(1-*m*), the common information-bearing transmit signal s(n) may be conjugate weighted by complex numbers $w_m$ to provide the transmit antenna signals $x_m(n)$, m=1, 2, ..., M. The single receive antenna 105 may receive the antenna signal y(n) set forth in equation (1). The mth transmit antenna signal may propagate to the single receive antenna 105 with channel impulse response $h_m(n)$. Thus, the receive antenna signal is given by $$y(n) = \sum_{m=1}^{M} h_m(n) * x_m(n) = \sum_{m=1}^{M} w_m^* h_m(n) * s(n). \quad (1)$$

where "*" as a superscript denotes complex conjugate and otherwise signifies convolution. The overall channel impulse response from the common transmit signal s(n) to the receiver antenna signal y(n) is then expressed as $$h(n) = \sum_{m=1}^{M} w_m^* h_m(n) \quad (2)$$

In this way, the overall channel impulse response from the common transmit signal s(n) to the single receiver antenna 105 may provide a linear-phase maximally flat overall channel response h(n), as indicated by equation (2).

To obtain a linear-phase maximally-flat overall channel response, the weight controller 130 may optimally adjust the antenna weights $w_m$. Instead of necessarily maximizing signal power for diversity combining, the equalizer 125 equalizes the channel response h(n) over desired bandwidths. The equalization of the composite propagation channel 120 may accommodate deep fades without sacrificing noise immunity. By using any number of channel sounding techniques, the equalizer 125 may determine the individual channel impulse responses $h_m$ as channel state information (CSI).

In an environment in which noise and interference may be negligible, the channel equalization may be based on a multiple-input/output inverse theorem (MINT) technique where acoustic reverberation in a room is reduced using multiple microphones. In that case, CSI over high fractional bandwidths (e.g., 100-4000 Hz) may be difficult to obtain and track, especially as objects move about in the room and/or in the face of time-varying propagation conditions due to the physical properties of air. However, for an RF application that may use pilot signals over relatively small fractional bandwidths (e.g., 2-2.1 GHz) may enable the equalizer 125 to estimate CSI even though the absolute bandwidth may be significantly greater.

One application for the equalizer 125 may involve a wideband wireless communication over a MISO or a single-input and multiple-output (SIMO) channel with high delay spread relative to an inverse bandwidth to provide an alternative to orthogonal frequency-division multiplexing (OFDM). The OFDM mitigates the effects of multi-path by breaking up the signal into many sub-bands. However, the channel equalization based on the equalize 125 may reduce effective delay spread even for OFDM. For example, with OFDM, a large delay spread exacts a penalty because it is necessary to precede every block of symbols by a cyclic prefix of similar length to counteract crosstalk, and this overhead reduces the payload efficiency. Accordingly, the equalizer 125 may provide "channel shortening" in OFDM as well as in other desirable applications to limit a cyclic prefix length based on optimal antenna weights.

To use the optimal antenna weights, the weight controller 130 may determine an optimal adjustment of the antenna weights $w_m$ for the antenna signal y(n). The equalizer 125 may equalize the overall channel response $h_m(n)$ over a desired bandwidth, such as a wideband frequency range. The equalizer 125 may flatten the frequency response of the composite propagation channel 120 over the wideband frequency range in response to the optimal antenna weights $w_m$.

More specifically, the equalizer 125 may form a propagation matrix for at least two of the signal propagation paths 122(1-m) on the composite propagation channel 120. Based on the propagation matrix, the equalizer 125 may compute a corresponding complex scalar weight coefficient for at least two of the set of transmit antennas 105(1-m).

By flattening the frequency response of the composite propagation channel 120 over a wideband frequency range, the equalizer 125 may provide an alternative to orthogonal frequency-division multiplexing (OFDM) for obviating frequency-dependent fading in broadband communication. As a result, the equalizer 125 may control fading of the composite propagation channel 120 in broadband communication. In another embodiment, the equalizer 125 may shorten the composite propagation channel 120 in conjunction with OFDM for wideband communication over one or more signal propagation channels 120(1-m) with a large delay spread.

To equalize the channel response of the composite propagation channel 120, the equalizer 125 may calculate a performance matrix to equalize a wideband communication system using the optimal complex weights $w_m$ for the set of transmit antennas 105(1-m). The transmitter 110 may communicate the wideband communication over the composite propagation channel 120 having a large delay spread relative to an inverse bandwidth.

According to one embodiment of the present invention, the wireless communication system 100 may use the plurality of transmit antennas 105(1-m) and a plurality of receive antennas to form the channel response for the composite propagation channel 120. In this way, the equalizer 125 may apply the corresponding complex scalar weight coefficients $w_m$ to the multiple inputs or multiple outputs.

Consistent with one embodiment, the equalizer 125 may comprise one or more conventional phase shifters and attenuators to obtain a desired channel response 125. In one embodiment of the present invention, to simulate the equalizer 125 an analytical model for a plurality of frequency/selective channels that fade independently may be formulated. To formulate the analytical model for the equalizer 125 in the frequency domain, equation (2) set forth above becomes $$H(k) = \sum_{m=1}^{M} w_m^* H_m(k) \quad (3)$$

where the frequencies may be indexed as k=1, 2, ..., K to cover a desired band of frequency of a given bandwidth. By normalizing the channel impulse responses $h_m(n)$ all initial delays may be removed. Therefore, a reasonable frequency-domain error criterion may be written as:

$$\xi = \frac{1}{K} \sum_{k=1}^{K} |H(k) - 1|^2 \quad (4)$$

$$= \frac{1}{K} \sum_{k=1}^{K} \left| \sum_{m=1}^{M} w_m^* H_m(k) - 1 \right|^2$$

$$= \frac{1}{K} \|H^H w - 1\|^2$$

where $$H \equiv \begin{bmatrix} H_1(1) & \cdots & H_1(K) \\ \vdots & \cdots & \vdots \\ H_m(1) & \cdots & H_m(K) \end{bmatrix} \quad (5)$$

indicates the M×K channel frequency response matrix, $w=[w_1\ w_2\ \ldots\ w_m]^T$ is the M×1 vector of complex weights, $1=[1\ 1\ \ldots\ 1]^T$ is a K×1 vector of ones, and superscript T denotes transpose. The term $\xi$ is referred to as a channel mean-square error (MSE).

In this way, for the equalizer 125 a channel error criterion for the frequency selective channels may be defined, as indicated by equation (4). As shown in equation (5), a channel frequency response matrix "H" and a complex weight vector "w" may provide a channel mean-square error (MSE). Using the channel mean-square error (MSE), as indicated in equation (4), the equalizer 125 may determine optimal antenna weights $w_{opt}$ for the corresponding complex scalar weight coefficients, as shown below in equation (6). A given minimum channel mean-square error may result, as shown below in equation (7). By differentiating with respect to w*, equation (4) may be minimized assuming that w is constant, giving $$w_{opt} = (HH^H)^{-1} H1 \quad (6)$$

and the resulting minimum channel MSE $$\xi\min = 1 - \frac{1}{K}(H1)^H w_{opt} \quad (7)$$

$$= 1 - \frac{1}{K}(H1)^H (HH^H)^{-1} H1$$

where for K=M and H full rank, $\xi_{min}=0$ However, for the wideband communications channel, such as the composite propagation channel 120 the number of frequencies K may be much larger than the number of antennas M, so that the minimum channel MSE may be non-zero.

To obtain optimal antenna weights $w_{opt}$, a channel frequency response metric as shown in equation (5) may enable the equalizer 125 to calculate the optimal antenna weights using equation (6). In other words, channel estimates over a wideband frequency range may be used to provide the optimal antenna weights $w_{opt}$.

If the channel responses may not be correlated over frequency, then the minimum error may be relatively large, even for relatively large M. In one case, for complex Gaussian varieties $H_m(k)$ that may not be correlated over both space (m) and frequency (k), that $\{\xi\}=1-M/K$. Thus, the channel mean-square error (MSE) may approach "1," as the bandwidth (K) increases since a limited number of antennas M may not adequately compensate for uncorrelated fading over an ever growing bandwidth.

Conversely, for completely correlated channels (flat fading), the channel frequency response matrix may be written as H=[h h ... h], where the frequency response from each antenna to the receiver 115 remains essentially constant. In this case, $HH^H$, is a rank-1 matrix and hence has no inverse.

Nevertheless, to obtain a (non-unique) solution for "w" and the resulting channel MSE as follows. A particular case of implicit solution of equation (6), without inverting $HH^H$, gives $hh^H w=1$. Since $h^H w$ is a scalar, then the solution w satisfies $hh^H w=1$. Substituting this result into equation (4) gives $\xi=0$. That is, with no frequency variation over the bandwidth, the equalizer 125 may equalize the composite propagation channel 120, even for a single antenna (M=1) case.

However, a partial correlation over frequency indicates that the M degrees of freedom may be afforded by the M transmit antennas 105(1-m), reducing the channel MSE. Accordingly, the larger M becomes, the smaller the channel MSE results for any given bandwidth K. Nevertheless, as the frequency range K increases without bound, the channel MSE may increase independent of the number of antennas M that may be employed. A frequency-selective fading model may enable a set of quantitative calculations of the channel MSE.

By using the optimal complex weights $w_{opt}$ to combine the antenna signals $x_m(n)$, m=1, 2, . . . , M, the equalizer 125 may provide a beamformer, i.e., where the antenna weights are in the form of a linear phase progression. Without the use of the complex weights, in one embodiment, the equalizer 125 provides a sub-optimal beamformer. A propagation model for the independently fading channels may reduce the complexity from that of the equalizer 125 based on optimal complex weighting. A weight vector in the form given below may be used as $$w = as(\phi) \quad (8)$$

where a is an arbitrary complex gain, $s(\phi)$ is the M×1 steering vector with components $s_m = e^{jm\theta}$, and $\phi$ is the phase gradient. For a given steering vector (i.e., value of $\phi$), a gain $a = a(\phi)$ may be selected so as to minimize the normalized channel MSE shown in equation (4), viz., $$\xi(\phi) = \min \frac{1}{K} \|aH^H s(\phi) - 1\|^2 \quad (9)$$

$$= \frac{1}{K} \|a(\phi)H^H s(\phi) - 1\|^2$$

where $$a(\phi) = \frac{s^H H 1}{\|H^H S\|^2} \quad (10)$$

A beam may be swept by allowing $\phi$ to vary from 0 to $2\pi$ and selecting a desired "beam," may result in the channel MSE $$\xi(\phi_{min}) = \min_\phi \xi(\phi). \quad (11)$$

To formulate an analytical model for the frequency-selective channels $H_m(k)$ that induces correlation over frequency (k), propagation in a scattering environment may be characterized by an exponentially-decaying impulse response power profile, where the individual components are independent complex Gaussian variates (independent scattering). However, such a model may be valid over a bandwidth that is much wider than the operating band of the wireless communication system 100 shown in FIG. 1.

Accordingly, a discrete-time baseband propagation model where the sampling rate may be relatively high in so far to capture all of the significant geometrical detail, decimation (filtering and down-sampling) may be used based on the high sampling rate for a given bandwidth of use. If the decay rate is relatively slow compared to an operating bandwidth, then the down-sampled baseband impulse response includes independent complex Gaussian components with an exponentially-decaying power profile. Thus, each normalized impulse response is modeled as $$h_m(n) = \sqrt{\frac{1-a}{1-a^K}} a^{n/2} v_m(n), \quad n = 0, 1, \ldots, K-1 \quad (12)$$

where $v_m(n)$ is a sequence of independent identically distributed Gaussian varieties with zero mean $[E\{v_m(n)\}=0]$ and unit variance $[E\{|v_m(n)|^2\}=1]$. The set of transmit antennas 105(1-m) may be widely spaced so that independent fading may occur on each channel, i.e., $v_m(n)$, m=1, 2, . . . , M may all be mutually independent. The power profile of this channel impulse response is given by $$E\{|h_m(n)|^2\} = \frac{1-a}{1-a^K} a^n, \quad n = 0, 1, \ldots, K-1 \quad (13)$$

which indicates an exponential decay at a rate of 10 $\log_{10} \alpha$ dB per sample. Since the channel responses have been normalized such that the power profile shown in equation (13) sums to unity. However, each impulse response is quasi-stationary as a particular realization may not vary in time, instead remains constant over intervals that are long compared to the inverse signal bandwidth. The channel frequency response is given by the discrete Fourier transform (DFT) of equation (12):

$$H_m(k) = \sum_{n=0}^{k-1} h_n(n) W^{nk} \quad (14)$$

where $$W \equiv e^{-j2\pi L K} \quad (15)$$

The frequency correlation function (FCF) indicates the correlation between the channel frequency response at one frequency with the response at another frequency spaced some distance away. For a discrete-time formulation, the FCF may be defined as:

$$\Gamma(k,l) \equiv E\{H_m(k)H^*_m(k-1)\} \quad (16)$$

where l is the frequency spacing index. Substituting equations (12) and (14) into (16) and using a property of $v_m(n)$, the FCF may be calculated as:

$$\Gamma(l) = \frac{1-a}{1-aW^l} \quad (17)$$

Equation (17) shows the DFT of the power profile set forth in equation (13). The k index may be dropped for the independent scattering model shown in equation (12), thus the FCF may be wide-sense stationary (WSS), depending only on the frequency spacing l (sometimes called the "spaced-frequency" correlation function). As a consequence of the normalization, $\Gamma(0)=1$ results.

Consistent with one embodiment, the equalizer 125 may define a propagation model based on at least one characteristic of frequency-selective fading associated with a plurality of frequency-selective channels, in one embodiment. By optimally adjusting the corresponding weights, the equalizer 125 may obtain a desired channel response.

In this manner, the equalizer 125 may provide multi-antenna equalization using a plurality of weighted transmit or receive antennas, such as the set of transmit antennas 105(1-m) and the single receive antenna 105 shown in FIG. 1. That is, instead of a conventional equalization of a single-antenna channel, the equalizer 125 may obtain a linear-phase maximally-flat overall channel response for the composite propagation channel 120.

To evaluate a performance metric for a particular application in a desired propagation environment, the equalizer 125 may be simulated using a frequency-selective fading model for optimal weighting of the antenna weights $w_m$ for the set of transmit antennas 105(1-$m$). The optimal weighting of the antenna weights $w_m$ may be based on an objective function associated with the composite propagation channel 120. For example, a channel frequency response metric "H" may be used for the composite propagation channel 120. The frequency-selective fading model may be based on independent fading of one or more propagation paths on the composite propagation channel 120 and Lorenzian frequency correlation based on nominally exponential power profile.

Accordingly, the equalizer 125 may simulate a multi-antenna equalization based on a desired discrete-time frequency correlation indicated in equation (17). For realizing the impulse responses shown in equation (12) or, alternatively, the frequency responses calculated in equation (14), a block of K frequency-domain samples may be generated directly by multiplying a vector of complex Gaussian random variables by the square root of the Toeplitz correlation matrix formed by equation (17), which would entail about O(K) multiplies/sample (neglecting the matrix rooting). Alternatively, an Lth-order autoregressive (AR) model may use L multiplies/sample. However, AR filtering in the frequency domain may not approximate an exponential power profile in the time domain, a time-domain formulation, whereby a block of K samples may be generated by multiplying K complex Gaussian variates with the square root of the desired power profile shown in equation (13). By using the fast Fourier transform (FFT), the frequency-domain realization may be obtained. Such approach may use only the multiplication of two K-point arrays and a K-point FFT, resulting in $O[1+\log_2(K)]$ multiplies/sample.

In a particular application, for a wideband RF impulse response that may be sampled at 10.24 GHz, corresponding to about 0.1 ns (3 cm) resolution, with a total length of 2048 samples (200 ns or 60 m), a first operating bandwidth of 160 MHz may be obtained by decimating by a factor of 64, providing a down-sampled impulse response of length K=32. A nominal correlation bandwidth of 32 MHz may imply an rms delay spread of approximately 0.3/32 MHz=9.4 ns and a 60-dB decay time of approximately 4/32 MHz=125 ns. The corresponding normalized correlation bandwidth may then be B=32/160=0.2, which, in terms of the down-sampled impulse response, providing a normalized rms delay spread of approximately 0.3/B=1.5 (decimated) samples and a normalized 60-dB decay time of approximately 4/B=20 samples. Similarly, for a second operating bandwidth of 640 MHz, which, for the same exemplary wideband RF impulse response described above, may be represented by normalized parameter values K=128 and B=0.05.

Figure 2A:
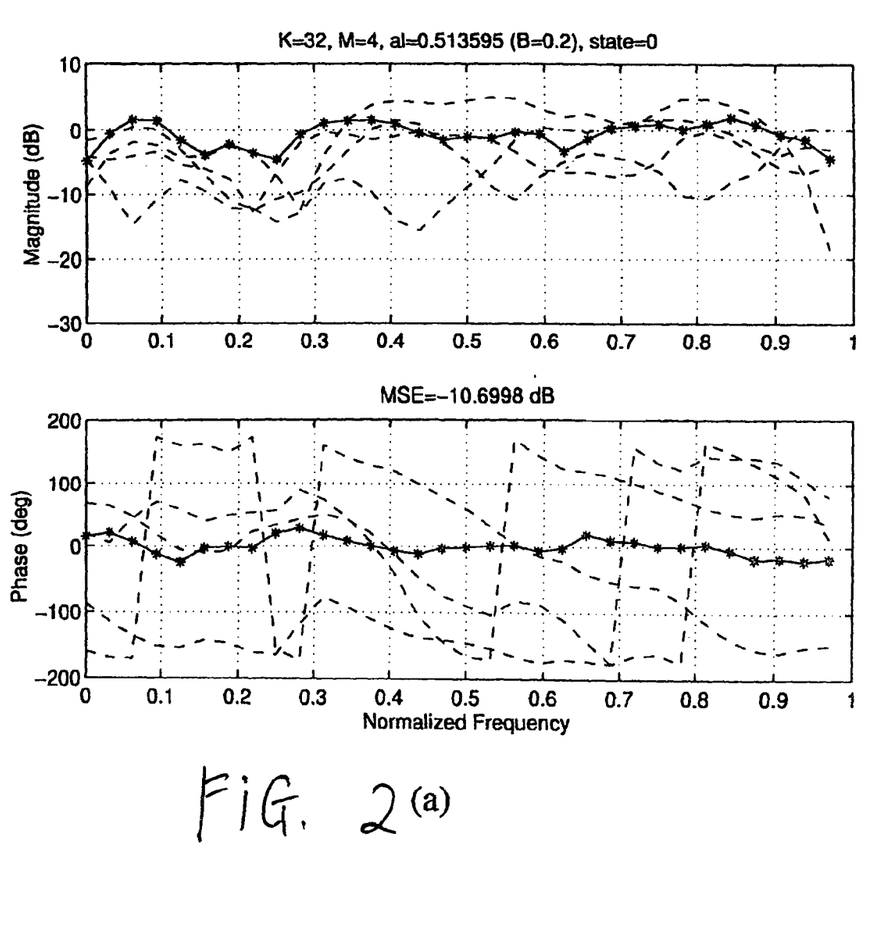
FIGS. 2a and 2b schematically illustrates an overall frequency response based on the optimal antenna weights and individual channel responses over two different bandwidths in accordance with one embodiment of the present invention.
Figure 2B:
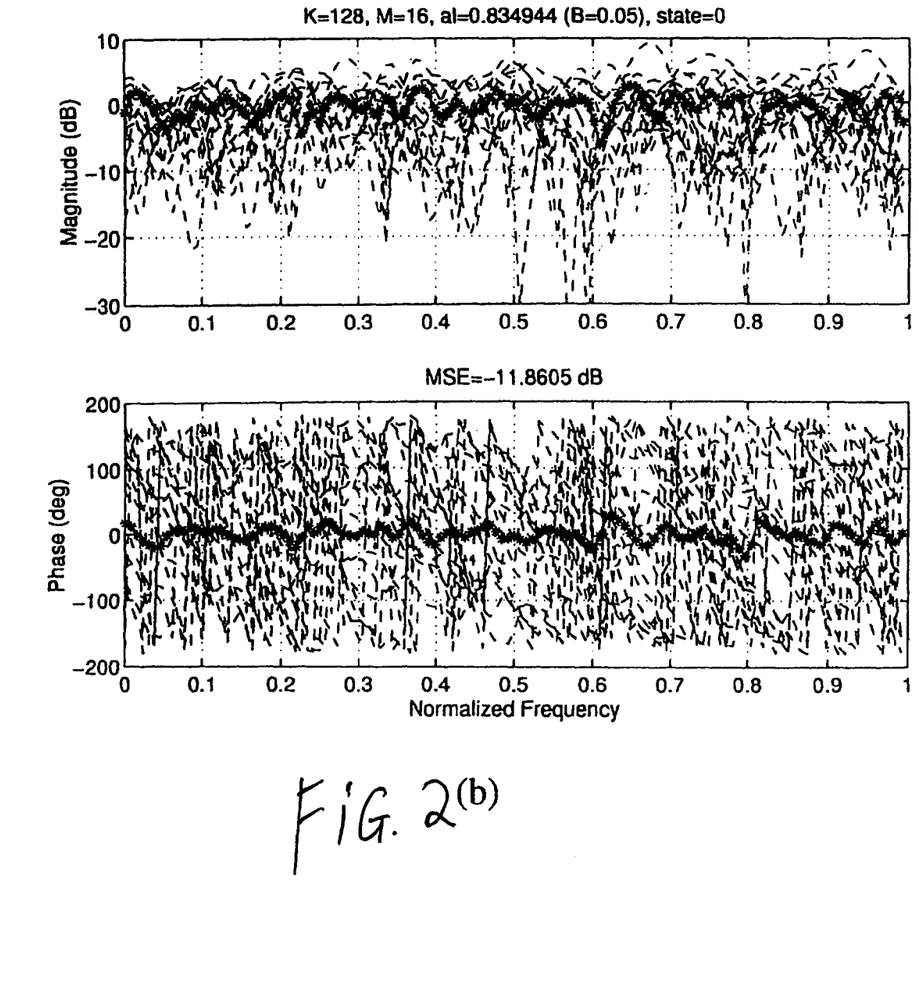

Referring to FIGS. 2a and 2b, a stylized chart schematically illustrates multi-antenna equalization in the frequency domain for two different bandwidths, e.g., the first and second operating bandwidths for the equalizer 125 in accordance with one embodiment of the present invention. A batch of M=4 independent random channels with normalized correlation bandwidth B=0.2 may form the channel matrix shown in equation (5). The equalizer 125 may calculate the optimal antenna weights $w_{opt}$ using equation (6). The resulting overall frequency response shown by equation (3) is illustrated by a solid trace in FIG. 2a. A set of four dashed lines each illustrate an individual channel response, which exhibits significant magnitude and phase variations over the bandwidth. The equalized channel may result in a channel MSE of −10.7 dB, as indicated by equation (7).

As the operating bandwidth increases, more antenna elements may be used to provide the same level of performance. In this case, as the number of frequency points K is increased, the normalized correlation bandwidth decreases (relative to the operating bandwidth). For example, if the operating bandwidth of FIG. 2a is increased by a factor of four (K=128), then the normalized correlation bandwidth (for the same power profile decay rate) reduces by a factor of four (B=0.05). In this case, the number of antennas M may be increased to maintain the same level of performance.

Turning now to Figure b, results for M=16 antennas may approximate the performance of the equalizer 125 illustrated in FIG. 2b in terms of the channel MSE (−11.9 dB). Thus, for a given level of performance, the number of antennas scales linearly with the operating bandwidth.

Figure 3:
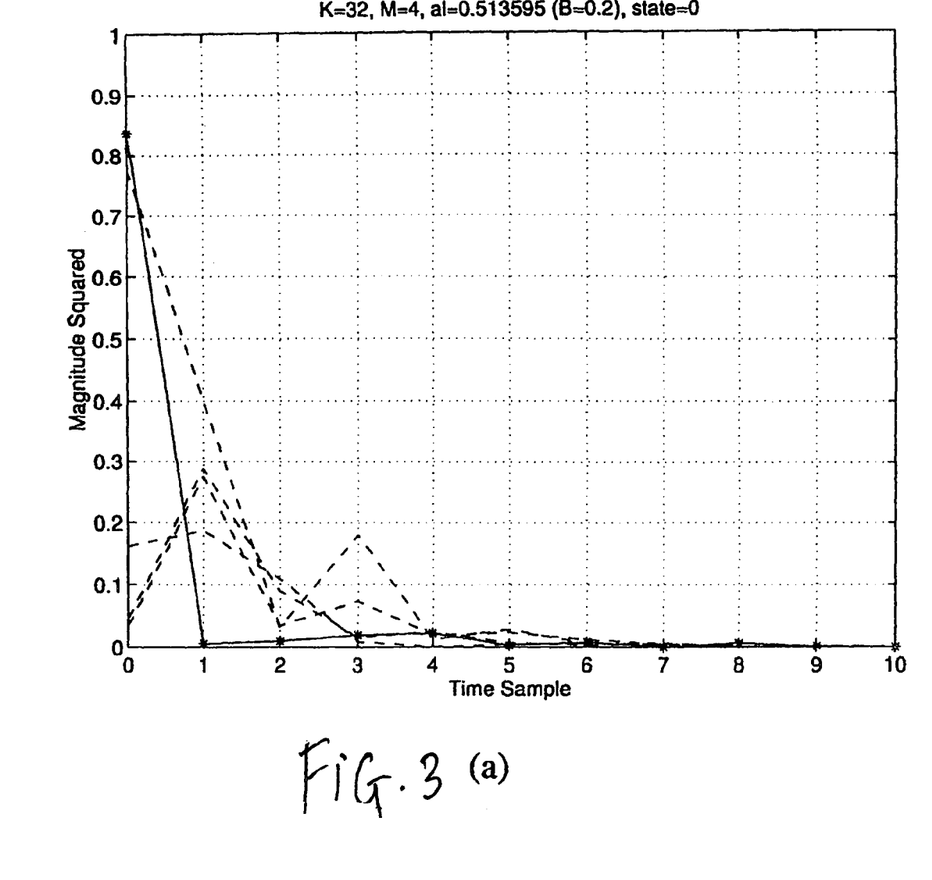
FIGS. 3a and 3b schematically illustrates channel shortening in response to equalization of the composite propagation channel over the wideband frequency range for two different bandwidths in the time domain and an optimized impulse response along with individual channel responses in accordance with one embodiment of the present invention.

Referring to FIGS. 3a and 3b, a stylized chart schematically illustrates equalization over two different bandwidths for the equalizer 125 in the time domain according to one embodiment of the present invention. That is, a plot of the inverse FFT of the frequency responses shown in FIGS. 2a and 2b indicates the channel shortening effect of the optimal equalization by the equalizer 125. For the case of M=4 antennas, FIG. 3a illustrates that the power of the largest delay component of the equalized impulse is only about 2% of the direct component. For M=16 antennas, the response depicted in FIG. 3b is essentially an ideal delta function, thereby limiting the shortened channel to only one effective sample.

Figure 4A:
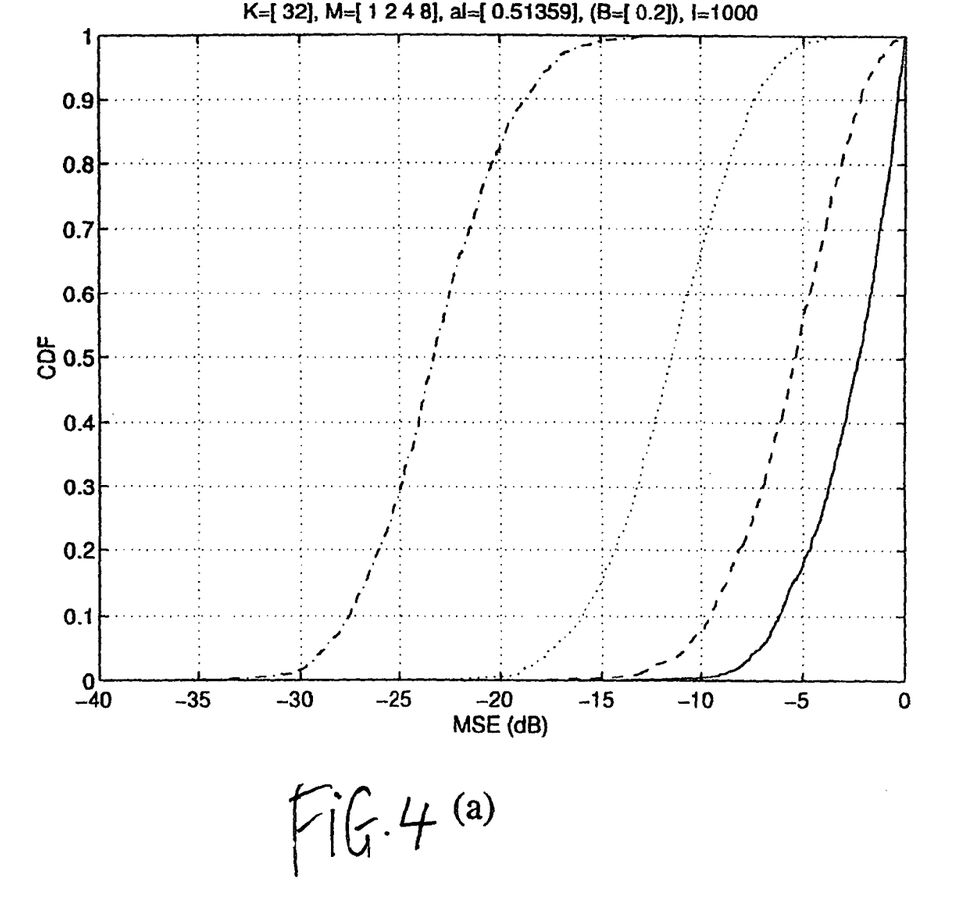
FIGS. 4a and 4b schematically illustrates a performance metric, such as a cumulative distribution function of mean-square error over two different bandwidths for the composite propagation channel based on the optimal antenna weights for different channel realizations according to one embodiment of the present invention.
Figure 4B:
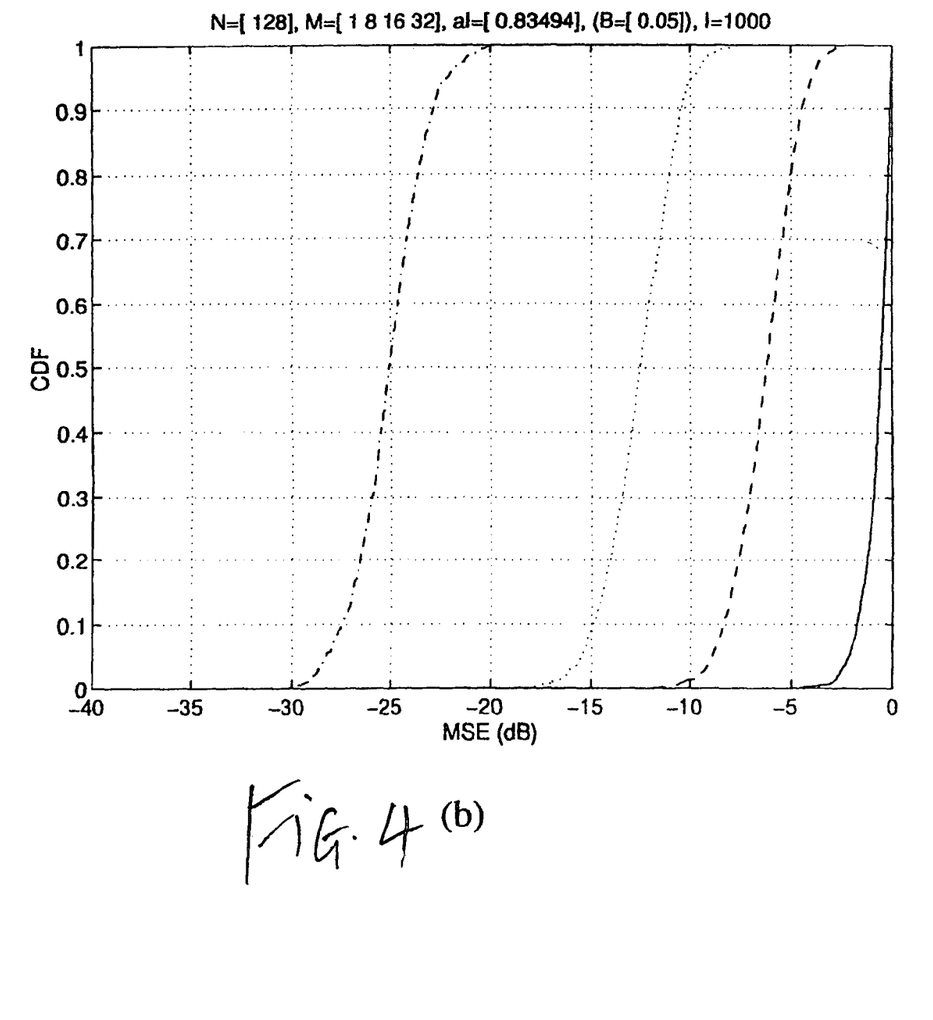

Referring to FIGS. 4a and 4b, a stylized chart schematically illustrates a performance metric for the equalizer 125 for two different bandwidths in accordance with one embodiment of the present invention. The performance metric for the equalizer 125 may be the cumulative distribution function (CDF) of the channel MSE for a set of multiple realizations for several values of M, where the other parameter values correspond to those used in FIGS. 2a-3b. In FIG. 4a, for example, K=32, B=0.2, and the traces, from right to left correspond to M=1, 2, 4, 8. The case of M=1 (solid line) corresponds to a conventional case of a single antenna and single fading channel, for which the channel MSE is significantly large. Some improvement may be obtained for M=2 antennas (dashed line), but M=4 antennas (dotted line) may realize a significant reduction of the channel MSE. In this case, the median channel MSE is indicated to be about −12 dB. An increase in the number of transmit antennas 105 to M=16 (dash-dot line) further reduces the channel MSE. Likewise, FIG. 4b illustrates similar results for K=128, B=0.05, and M=1, 8, 16, 32.

Figure 5:
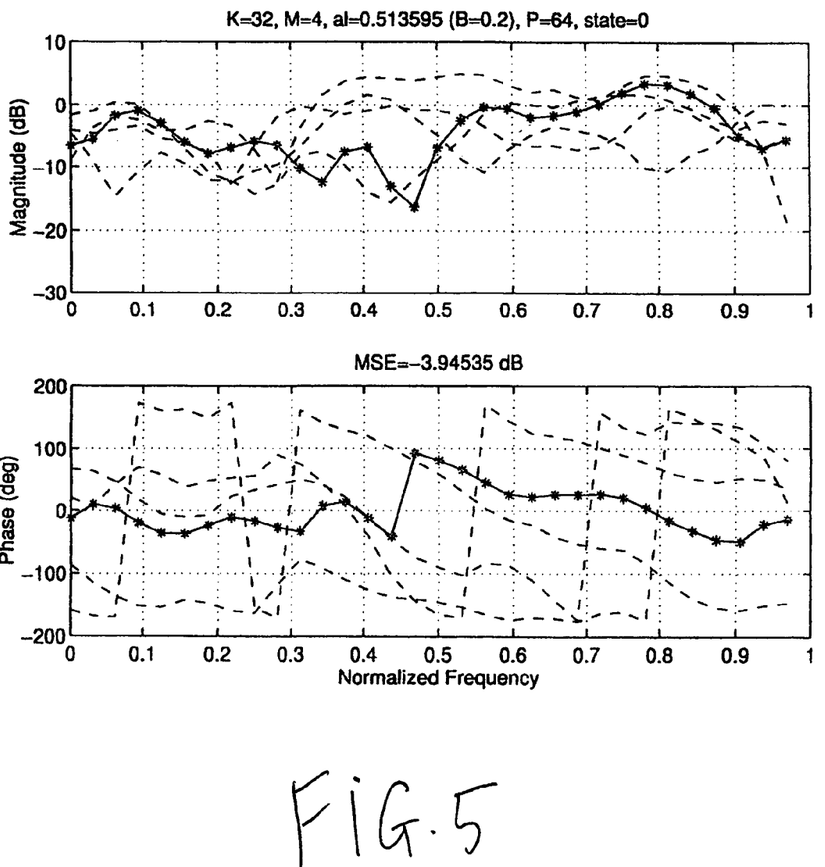

Referring to FIG. 5, a stylized chart schematically shows the overall frequency response of a conventional beamformer, which can be compared to the responses shown in FIG. 2a according to one embodiment of the present invention. That is, the optimal equalization by the equalizer 125 may be compared with the performance of a conventional beamformer described by equation (11). By using M=4 antennas, for example, quantization to P=64 phases over (0.2\πi is sufficient to attain performance in the vicinity of the median to within about 0.02 dB of a continuous-phase minimization. The resulting overall frequency response may be compared to FIG. 2a.

Figure 6:
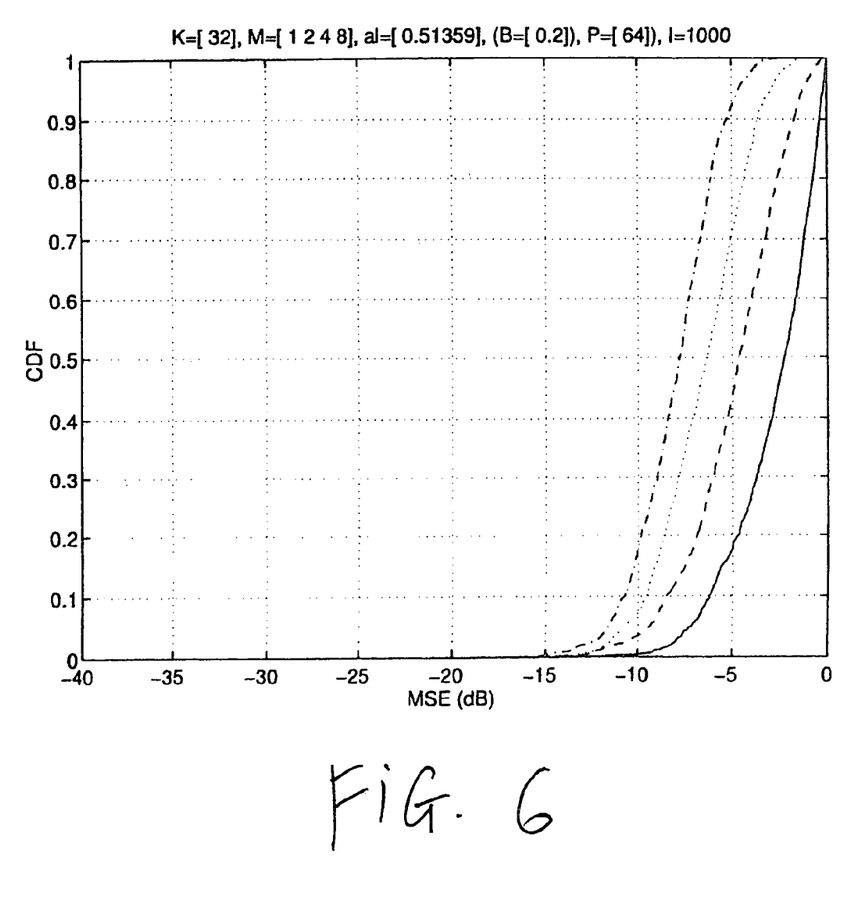

Turning now to FIG. 6, a stylized chart schematically shows a performance metric, such as a cumulative distribution function (CDF) of mean-square error (MSE) associated with the composite propagation channel 120 of a conventional beamformer, which can be compared to FIG. 4a according to one embodiment of the present invention.

The overall frequency response of a conventional beamformer shown in FIG. 5 may be compared to FIG. 2a. FIG. 6 in comparison to FIG. 4a further reinforces the conclusion derived that a relatively larger number of antennas than used by the equalizer 125 may only provide a comparable performance by the conventional beamformer.

Consistent with one embodiment of the instant invention, the wireless communication system 100 may comprise a plurality of base stations to provide wireless connectivity to a mobile station according to any desirable protocol. In particular, the transmitter 110 disposed at a base station may use any one of a desired communication protocols including a code division multiple access (CDMA, CDMA2000) protocol, wideband-CDMA (WCDMA) protocol, a Universal Mobile Telecommunication System (UMTS) protocol, a Global System for Mobile communications (GSM) protocol, and like to communicate with the receiver 115 disposed at the mobile station. Examples of the mobile station may include a host of wireless communication devices including, but not limited to, cellular telephones, personal digital assistants (PDAs), and global positioning systems (GPS) that employ the wireless communication system 100 to operate in a high-speed wireless data network, such as a digital cellular CDMA network. Other examples of the mobile stations may include smart phones, text messaging devices, and the like.

In one embodiment, the wireless communication system 100 may wirelessly communicate mobile data at a speed and coverage desired by individual users or enterprises. According to one embodiment, the high-speed wireless data network may comprise one or more data networks, such as Internet Protocol (IP) network comprising the Internet and a public telephone system (PSTN). The 3rd generation (3G) mobile communication system, namely Universal Mobile Telecommunication System (UMTS) supports multimedia services according to 3rd Generation Partnership Project (3GPP2) specifications. The UMTS also referred as Wideband Code Division Multiple Access (WCDMA) includes Core Networks (CN) that are packet switched networks, e.g., IP-based networks. Because of the merging of Internet and mobile applications, the UMTS users can access both telecommunications and Internet resources. To provide an end-to-end service to users, a UMTS network may deploy a UMTS bearer service layered architecture specified by Third Generation Project Partnership (3GPP2) standard. The provision of the end-to-end service is conveyed over several networks and realized by the interaction of the protocol layers.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention set forth above is described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

While the invention has been illustrated herein as being useful in a telecommunications network environment, it also has application in other connected environments. For example, two or more of the devices described above may be coupled together via device-to-device connections, such as by hard cabling, radio frequency signals (e.g., 802.11(a), 802.11(b), 802.11(g), Bluetooth, or the like), infrared coupling, telephone lines and modems, or the like. The present invention may have application in any environment where two or more users are interconnected and capable of communicating with one another.

Those skilled in the art will appreciate that the various system layers, routines, or modules illustrated in the various embodiments herein may be executable control units. The control units may include a microprocessor, a microcontroller, a digital signal processor, a processor card (including one or more microprocessors or controllers), or other control or computing devices as well as executable instructions contained within one or more storage devices. The storage devices may include one or more machine-readable storage media for storing data and instructions. The storage media may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy, removable disks; other magnetic media including tape; and optical media such as compact disks (CDs) or digital video disks (DVDs). Instructions that make up the various software layers, routines, or modules in the various systems may be stored in respective storage devices. The instructions, when executed by a respective control unit, causes the corresponding system to perform programmed acts.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method of using a plurality of antennas for a wireless communication, the method comprising:
   determining a plurality of complex weights based on a plurality of channel impulse responses, wherein each channel impulse response relates a first signal transmitted from one of the plurality of antennas to a second signal received by a receive antenna at a plurality of frequencies, wherein the plurality of complex weights are determined such that a composite channel response at the receive antenna is substantially flat over the plurality of frequencies, wherein the composite channel response is equal to a sum of a plurality of products associated with the plurality of antennas, and wherein each of the plurality of products is a product of a complex weight and a corresponding channel impulse response for one of the plurality of antennas;
   applying each complex weight to a signal to be transmitted by a corresponding one of the antennas to form a plurality of weighted signals; and
   transmitting each of the plurality of weighted signals from the corresponding one of the plurality of antennas.

2. The method, as set forth in claim 1, wherein determining the plurality of complex weights comprises determining the plurality of complex weights such that the composite channel response is linear-phase maximally flat over the plurality of frequencies.

3. The method, as set forth in claim 1, wherein equalizing the composite channel response further comprises:
   calculating a performance metric to equalize said composite channel response using optimal complex weights for the corresponding weights associated with at least two antennas of said plurality of antennas.

4. The method, as set forth in claim 3, further comprising:
   forming a propagation channel matrix based on the plurality of channel impulse responses.

5. The method, as set forth in claim 4, further comprising:
   computing said complex weights for said at least two said antennas based on said propagation channel matrix.

6. The method, as set forth in claim 1, wherein the plurality of frequencies are within a wideband frequency range of at least 150 MHz.

7. The method, as set forth in claim 1, wherein determining the complex weights comprises determining the complex weights to compensate for frequency selective controlling fading within the plurality of frequencies.

8. The method, as set forth in claim 1, wherein transmitting each of the plurality of weighted signals comprises transmitting each of the plurality of weighted signals over a plurality of sub-bands using orthogonal frequency-division multiplexing, and wherein determining the complex weights comprises determining the complex weights to limit at least one cyclic prefix length for transmission over at least one of the sub-bands.

9. The method, as set forth in claim 1, wherein said composite channel response has a large delay spread relative to an inverse bandwidth, and wherein determining the complex weights comprises determining the complex weights to reduce the large delay spread.

10. The method, as set forth in claim 2, wherein said composite channel response is based on a transmit antenna array transmitting to a receive antenna array, and wherein the transmit antenna array comprises the plurality of antennas, and the receive antenna array comprises the receive antenna.

11. The method, as set forth in claim 10, further comprising:
    applying the corresponding complex weights to multiple inputs or multiple outputs based on a configuration of the transmit antenna array.

12. The method, as set forth in claim 11, further comprising:
    formulating an analytical model for a plurality of frequency-selective channels that fade independently and correspond to the plurality of channel impulse responses.

13. The method, as set forth in claim 12, further comprising:
    defining a channel error criterion for said frequency selective channels.

14. The method, as set forth in claim 13, wherein determining the complex weights comprises determining optimal antenna weights for corresponding complex scalar weight coefficients to adjust a phase and a magnitude of the composite channel response.

15. The method, as set forth in claim 1, further comprising:
    defining a propagation model based on at least one characteristic of frequency-selective fading associated with a plurality of frequency-selective channels.

16. The method, as set forth in claim 15, wherein determining the complex weights comprises optimally adjusting the complex weights to obtain a desired channel response.

17. The method, as set forth in claim 16, wherein determining the complex weights comprises determining the complex weights to obtain a linear-phase maximally-flat composite channel response.

18. The method, as set forth in claim 1, further comprising:
    providing multi-antenna equalization using the plurality of antennas or the receive antenna.

19. The method, as set forth in claim 1, further comprising:
    defining a frequency-selective fading model for at least two signal propagation paths corresponding to the plurality of channel impulse responses; and
    obtaining a single desired channel response from the plurality of antennas.

20. The method, as set forth in claim 1, further comprising:
    simulating a frequency-selective fading model based on independent fading of at least two signal propagation paths corresponding to the plurality of channel impulse responses and Lorenzian frequency correlation based on a nominally exponential power profile.

21. The method, as set forth in claim 1, further comprising determining the composite channel response for a composite channel for wireless communication between the plurality of antennas and the receive antenna.

22. The method, as set forth in claim 1, wherein determining the composite channel response comprises determining the composite channel response using channel sounding to determine the channel impulse responses that form the composite channel, and wherein each channel impulse response represents a channel from one of the plurality of antennas to the receive antenna.

23. The method, as set forth in claim 1, further comprising determining a propagation matrix that represents the composite channel response, and wherein determining the plurality of complex weights comprises determining the plurality of complex weights based upon the propagation matrix.

24. A method comprising:
    determining a plurality of channel impulse responses, wherein each channel impulse response represents channels between one of a plurality of transmit antennas and a receive antenna at a plurality of frequencies;
    determining complex weights for the plurality of transmit antennas based on the plurality of channel impulse responses such that a composite channel response equal to a sum of antenna channel responses at the receive antenna is substantially flat over the plurality of frequencies, wherein each antenna channel response is a product of one of the complex weights and one of the plurality of channel impulse responses for a corresponding antenna;
    applying each complex weight to a signal to be transmitted by a corresponding one of the antennas to form a plurality of weighted signals; and
    transmitting each of the plurality of weighted signals from the corresponding one of the plurality of antennas.

25. The method, as set forth in claim 24, wherein determining the plurality of complex weights comprises determining the plurality of complex weights such that the composite channel response is linear-phase maximally flat over the plurality of frequencies.

* * * * *